Dec. 30, 1924.
H. ALLEN
RECEPTACLE MOVING AND DUMPING APPARATUS
Filed Jan. 19, 1924  3 Sheets-Sheet 3
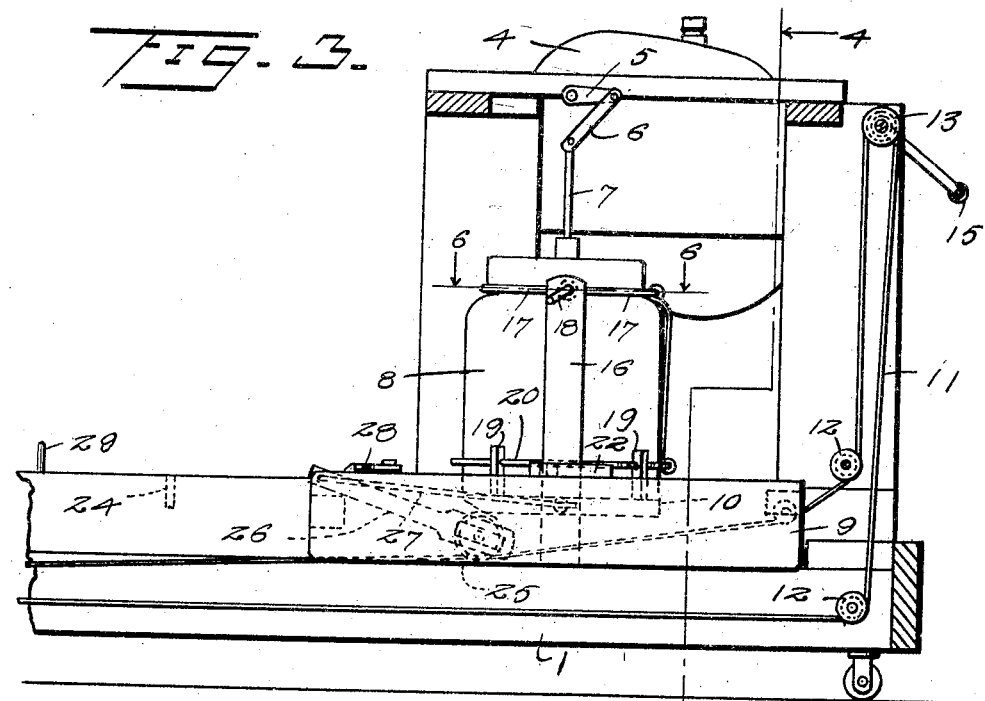
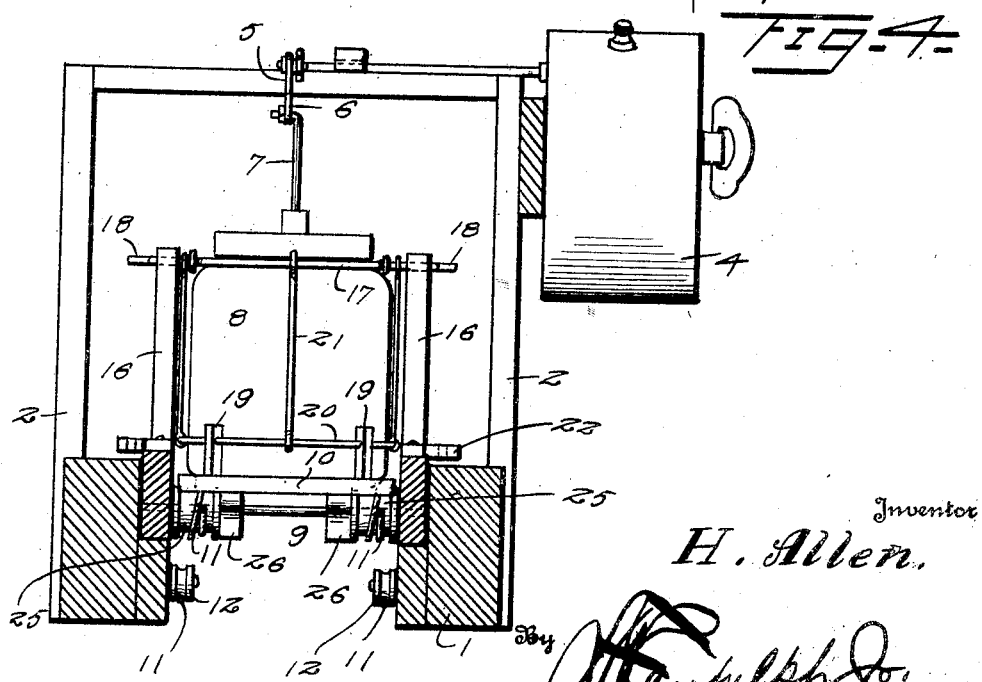

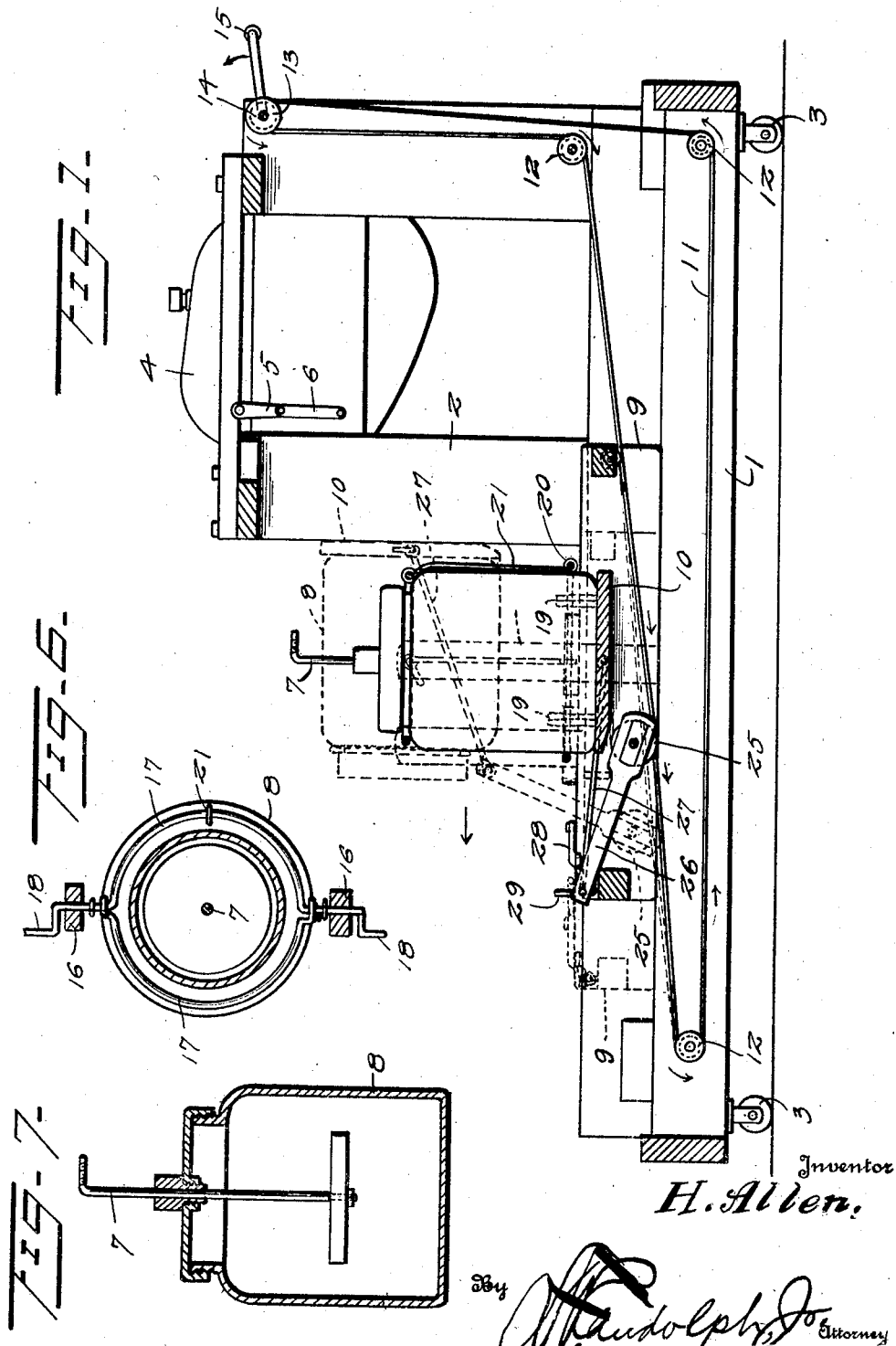

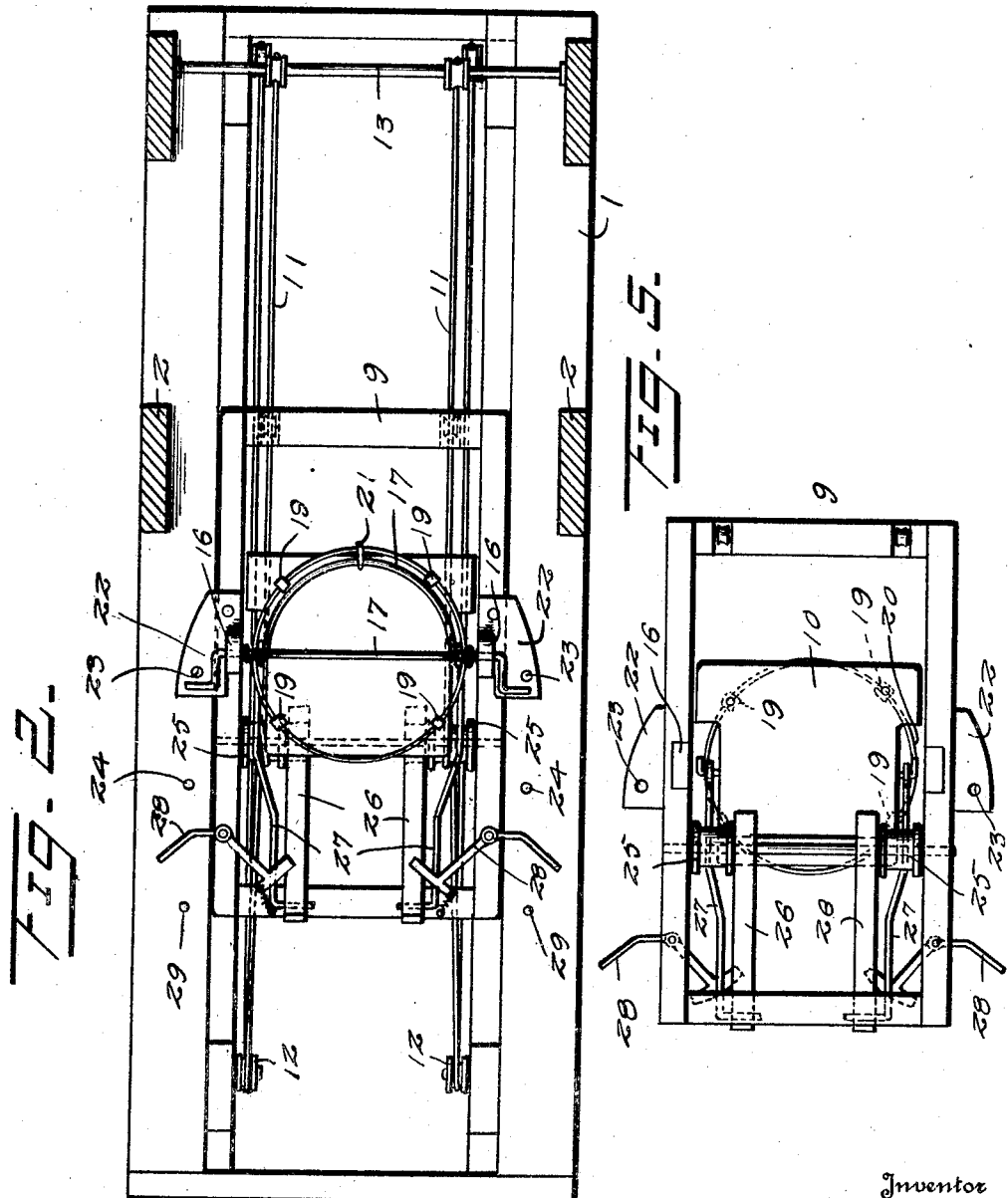

Patented Dec. 30, 1924.

1,521,413

UNITED STATES PATENT OFFICE.

HARVIE ALLEN, OF ANNISTON, ALABAMA.

RECEPTACLE MOVING AND DUMPING APPARATUS.

Application filed January 19, 1924. Serial No. 687,302.

*To all whom it may concern:*

Be it known that I, HARVIE ALLEN, a citizen of the United States, residing at Anniston, in the county of Calhoun and State of Alabama, have invented certain new and useful Improvements in Receptacle Moving and Dumping Apparatus; and I do hereby declare the following to be a full, clear, and exact description of the invention, such as will enable others skilled in the art to which it appertains to make and use the same.

The present invention relates to devices for moving and dumping receptacles, and has particular reference to dairy apparatus and to mechanism for separating the globules of butter from milk and cream by a churning process, and aims to provide a machine including a framework, a carriage, a receptacle mounted upon the carriage for receiving the milk or cream to be churned, an operating mechanism such as a motor, means for moving the carriage to carry the receptacle toward and away from the operating mechanism, and means for tilting the carriage to discharge the contents of the receptacle.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a vertical longitudinal section of a churn mechanism embodying the invention, the receptacle for receiving the milk or cream being shown in full lines, Figure 2 is a top plan view of the mechanism, the upright portion of the frame being in section, Figure 3 is a vertical longitudinal section of a portion of the machine showing the carriage at the limit of its rearward movement and the churn dasher connected to the operating mechanism.

Figure 4 is a detail sectional view on the line 4—4 of Figure 3, looking in the direction of the arrows, Figure 5 is a view of the carriage, as seen from the bottom side, Fig. 6 is a sectional detail of the churn receptacle on the line 6—6 of Figure 3, and Figure 7 is a vertical central sectional view of the churn receptacle showing the dasher.

Corresponding and like parts are referred to in the following description and designated in the several views of the drawings by like reference characters.

The churning machine comprises a main frame including a horizontal or base portion 1 and an upright portion 2 at one end thereof. To facilitate moving the machine from one place to another, it is mounted upon rolling supports 3 such as casters. The numeral 4 designates an operating mechanism which preferably consists of a spring motor, the same being mounted at one side of the upright portion 2 of the main frame. The numeral 5 designates a crank arm fast to the shaft of the motor, the same being connected by means of a link 6 to the upper end of the dasher shaft 7 which is arranged to reciprocate vertically in a receptacle 8 adapted to receive the milk or cream to be churned.

A carriage 9 is mounted upon the horizontal or base portion 1 of the frame to move thereon and is provided with a platform 10 upon which the receptacle 8 is secured in a manner to admit of its tilting, as indicated by the dotted lines in Figure 1. Endless cords 11 or analogous flexible connections are provided for moving the carriage and these connections 11 cooperate with suitably disposed guide pulleys 12 to insure proper movement of the carriage along the base portion of the frame. A shaft 13 is mounted at the top of the upright portion 2 of the frame and is provided near each end with a pulley 14 which cooperates with an endless connection 11, whereby to move the carriage on the frame as required. The shaft 13 is provided with an operating crank 15.

Uprights 16 are disposed at opposite sides of the carriage 9 and a retainer 17 is mounted in the upper ends thereof and its journals are extended beyond the uprights and terminate in cranks 18. The retainer 17 is of ring formation and engages the neck of the churn receptacle 8 to hold the same upon the platform 10. A plurality of posts 19 project upwardly from the platform 10 and support a ring 20 which encircles the lower portion of the churn receptacle 8, whereby to prevent displacement thereof from the platform, this being essential when it is remembered that the platform and receptacle tilt, as indicated by the dotted lines in Figure 1. A tie 21 connects the retainer 17 with the ring 20. Wings 22 project laterally from opposite sides of the carriage and overlap the side beams of the base 1 and are provided with openings 23 which are adapted to register with corresponding openings 24 in the side beams of the base 1 so as to receive pins (not shown) whereby to hold the carriage at the limit of its forward movement.

Drums 25 are provided at opposite sides of the carriage 9 and a lever 26 is associated with each so as to turn therewith. A run of the endless connection 11 is given a turn around each of the drums 25, as shown most clearly in Figure 4, and the outer ends of the levers 26 are connected by links 27 to opposite sides of the platform 10 and when the drums 25 are rotated in a clockwise direction, the parts assume a position shown by the dotted lines in Figure 1, whereby the churn receptacle 8 is tilted so as to discharge its contents. Latches 28 pivoted intermediate their ends to opposite sides of the carriage are adapted to have their inner ends engage the levers 26 and prevent movement thereof and the tilting of the platform 10. Pins 29 projecting upwardly from the side beams of the base 1 are adapted to engage the outer ends of the latches 28 and trip the same to release the levers 26, thereby permitting rotation of the drums 25 by means of the endless connections 11, with the result that the churn receptacle is automatically tilted to discharge its contents when the carriage reaches the limit of its outward movement after the milk or cream has been churned.

What is claimed is:

1. A machine of the class described, a frame, a carriage movably mounted on said frame, an elevating and tilting platform mounted on the carriage, operating means for said carriage, and means actuated by said operating means to tilt the platform.

2. A machine of the class described, a frame, a carriage movably mounted on said frame, an elevating and tilting platform mounted on the carriage, an endless belt for moving the carriage, and means connected to said platform and actuated by said belt to tilt the platform.

3. A machine of the class described, a frame, a carriage slidably mounted on said frame, uprights on said carriage, a platform, a frame work secured to said platform and pivotally engaging said uprights, a lever pivotally mounted on said platform and connected to said platform, a rotary member operatively secured to said lever, and endless belts trained around said rotary member.

4. A machine of the class described comprising a supporting frame, an operating mechanism thereon, a carriage, a platform tiltingly mounted upon the carriage and adapted to support a receptacle, an endless connection for moving the carriage, a rotary member mounted upon the carriage and adapted to be actuated by the endless connection, a lever extending from the rotary member and having connection with the tilting platform, a latch normally engaging said lever, and means for tripping the latch to admit of automatic tilting of the platform by the action of said endless connection through the rotary member and lever associated therewith to automatically discharge the contents of the receptacle mounted upon said platform.

In testimony whereof, I affix my signature in presence of two witnesses.

HARVIE ALLEN.

Witnesses:
J. W. M. LANEY,
RUSSELL HARRIS.